United States Patent [19]

Acker

[11] 3,800,282

[45] Mar. 26, 1974

[54] CODE READING SYSTEM

[75] Inventor: Norbert K. Acker, Konigstein/Taunus, Germany

[73] Assignee: Scanner, Inc., Houston, Tex.

[22] Filed: July 23, 1971

[21] Appl. No.: 165,078

Related U.S. Application Data

[63] Continuation of Ser. No. 818,030, April 21, 1969, abandoned.

[52] U.S. Cl. .................... 340/146.3 Z, 235/61.11 E

[51] Int. Cl. .................... G06k 9/18

[58] Field of Search .......... 340/146.3; 250/219 CR; 235/61.11 E

[56] References Cited

UNITED STATES PATENTS

| | | | |
|---|---|---|---|
| 3,546,670 | 12/1970 | Glass et al. | 340/146.3 D |
| 3,257,545 | 6/1966 | Van Berkel et al. | 340/146.3 Z |
| 3,453,419 | 7/1969 | Torrey | 235/61.11 E |
| 3,410,991 | 11/1968 | Van Berkel | 340/146.3 Z |
| 3,414,731 | 12/1968 | Sperry | 340/146.3 Z |
| 3,418,456 | 12/1968 | Hamisch et al. | 235/61.11 |

OTHER PUBLICATIONS

W. Dietrich, Electrical Communication, "Optical Character Readers for Automatic Document Handling in Banking Applications," Vol. 40, No. 3, 1965, pp. 317–322.

*Primary Examiner*—Paul J. Henon
*Assistant Examiner*—Leo H. Boudreau
*Attorney, Agent, or Firm*—Smyth, Roston & Pavitt

[57] ABSTRACT

A device is disclosed for machine-reading information having random position and orientation and being comprised of characters which in parts are also man-readable. An image of such information is produced, centered and rotated. The characters are read during rotation in a serial and parallel-by-bit format. Representation of the characters is assembled from read signals and tested as to format.

12 Claims, 8 Drawing Figures

INVENTOR:
NORBERT K. ACKER

By Smyth, Roston & Pavitt

ATTORNEYS

INVENTOR
NORBERT K. ACKER

By Smyth, Roston & Pavitt
ATTORNEYS

INVENTOR:
NORBERT K. ACKER

By Smyth, Roston & Pavitt
ATTORNEYS

INVENTOR
NORBERT K. ACKER

By Smyth, Roston & Pavitt
ATTORNEYS

CODE READING SYSTEM

This is a continuation of application, Ser. No. 818030, filed Apr. 21, 1969, now abandoned.

The present invention relates to a device for machine-reading of information, and more particularly the invention relates to improvements in devices as disclosed in my copending application Ser. No. 788,302, filed Dec. 31, 1968. Briefly, in the copending application apparatus is described for reading information which passes through a search field or inspection zone at random position and random orientation. The information is included in the data fields affixed, for example, to individual data carriers. In essence, apparatus as disclosed in the present application, as well as in the copending application, requires that an image of the search field is produced, particularly when a data field passes therethrough, and through lateral shifting, as well as rotary motion between the image and a data field reading head or device, the data field is properly positioned and oriented for readout.

As a preferred field of application in which systems of the character described find preferred utility, the data field may be affixed to or printed on items of merchandise, such as wrappers, boxes, containers, or the like, and the items of merchandise are, in one way or another, identified by data contained in the data field. Apparatus of this type which provides proper readout positioning as between a data field image and the reading device proper, obviates handling of the data carrier for purposes of data readout. It is particularly important that the data field carrier does not have to be particularly positioned and oriented in relation to the data field readout means.

Features of the improvement described and claimed in the present application relate to the configuration of the data field, and the corresponding readout equipment, bearing in mind particularly that the cooperation of a particular data field and of a particular readout equipment, is designed to reduce read errors and particularly to reduce errors in the reconstruction, storage and registration, or the like of the data read from the several data fields. The data field has a plurality of parallel tracks, preferably arranged concentrically around a center. The data recorded in such data field comprises a plurality of characters, preferably representative of decimal numerals and encoded in that each character is defined by a plurality of bits, partially arranged in parallel across several tracks and partially in series along a portion of each such track. This encoding will, in the following, be described as serial and parallel-by-bit as to each character, and serial-by-character as to the recording format in the data field.

Preferably, two tracks are provided and the encoding format is chosen such that each character has a particular number of bivalued bits and for each of the two possible values thereof. The readout and data processing operation includes testing as to the presence of these particular numbers of particular valued bits for each character. The data field is provided on the data carrier such that an image can be produced, and bits of one value will be represented by contrasting markings on a background field. The bits having the other value may, for example, be provided by absence of such markings in the associated bit positions and within the character format.

These bits are, as stated, markings (or absence of markings) extending across the several tracks. Two bits of the same value and represented by contrasting markings in parallel positions in two tracks would, therefore, form a contrast producing line which extends across the two tracks. By using additional contrast producing markings which extend longitudinal to the tracks and in between them, contrast producing markings can be interconnected in such a manner that for at least some of the encodings there will result a visual impression resembling the appearance of the normal decimal digit to be encoded in that manner.

As stated here, the reading apparatus includes equipment operating so that the image of a data field passing through the above-mentioned inspection zone and search field is laterally shifted to assume and maintain a particular position. If, in the preferred form of practicing the invention, the two tracks of a data field wrap around the center, the readout process is carried out additionally in that prior to data reading and/or evaluating, at least subsequent to obtaining such particular lateral position, rotation is produced between the track reading means and the image of the data field about the center of the image of the data field. The tracks and, therefore, the data field are read through progressive scanning of track images along their extension, and in case of circular trades this reading is part of the angular orienting process as between the image of data field and the data reading means.

The data field is provided with a special or control marking which defines a particular angular orientation of the data field such as the beginning of the data contained in the field. Such control marking may simply be provided in the form of a data gap, so that during readout gap detection, for example, precedes the assembling of characters. Thus, there is first an electronic detection process (gap detection) of the angular orientation of the data field image, and the data word assembly as representation of the information proper in the data field progresses from there. Therefore, the orientating process of a randomly oriented data field is established as part of the readout signal processing. Once a particular orientation of the data field image has been established (gap detection) readout and readout signal processing as to information restoration progressed from there; particularly the characters are assembled in the order of presentation of data bits subsequent to data gap detection.

The characters are assembled after the readout process by assembling the several bits and by distinguishing the bits associated with a character from bits associated with other characters. A character as assembled or as to be assembled, is tested as to the number of bits of particular value and whether or not this assembly of bits constitutes, in fact, a legal character. A legal character within this context is an assembly of bits which satisfies the format requirement and presents, in fact, a particular character within the chosen encoding format for characters, to the exclusion of other bits assemblies outside the encoding scheme.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Figures 1, 2, 2A, 3:
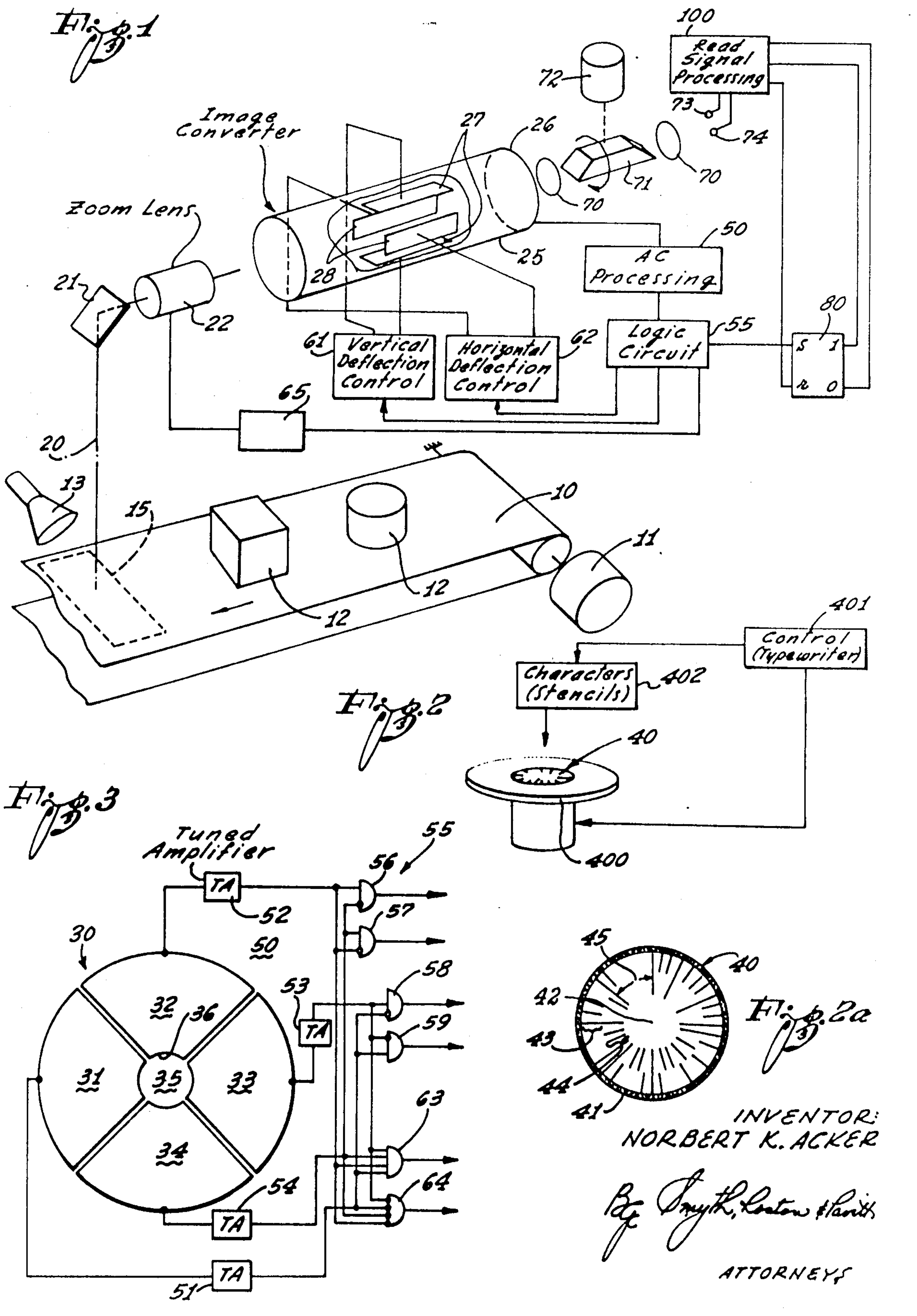
FIG. 1 illustrates partially in perspective view and partially as schematic block diagram, a data field readout station as an example of the preferred embodiment for practicing the present invention.
FIG. 2 illustrates schematically the providing of a data field.
FIG. 2a illustrates representatively an elevation of a circular data field on a data carrier produced as shown in FIG. 2 and provided for passing through an inspection zone or search field of the readout station shown in FIG. 1.
FIG. 3 illustrates schematically and partially in circuit diagram an input control circuit used to initiate lateral image positioning control for the image of the search field containing a data field as produced in the system shown in FIG. 1.

Proceeding now to the detailed description of the drawings, in FIG. 1 thereof there is illustrated a system in which the preferred embodiment of the present invention is practiced with advantage. There is provided a conveyor belt 10 driven by a motor 11 at constant speed or intermittently, or with variable speed, a slowdown occurring during particular phases of scanning and detection operation to be described more fully below. The conveyor belt transports items 12 of merchandise, such as packages, containers, or the like. Each of these items is provided with a data field, and thus serves in a general sense as data storage carrier.

A representative example for such data field is shown in FIG. 2a. The data field is preferably a circular area bounded by a contrast producing marker ring 41 extending around a data field center 42. The data itself consists of radial contrasting markers arranged in two concentrical tracks 43 and 44 which extend around the center 42. Beginning and end of each track is defined by a data gap 45 which, in a general sense, can be regarded as a marking for defining a particular angular position of the data in the field.

As schematically shown in FIG. 2, a data field 40 can be defined by a label to be affixed to an individual item of merchandise 12. The label 40 may be placed on a stepwise rotating table 400, the rotation being under control of a typewriter-like keyboard control 401 or the like, causing the table to rotatably advance with actuation of each key and around the thus defined center of the data field. The control unit 401 may be operated manually to trigger stencil-like keys in a printing unit 402 to cause characters to be printed on label 40 to cause characters to be printed on label 40 around the center 42 thereof. Example of such characters will be described below with reference to FIGS. 4 and 6. In any event, the several characters indentifying an item of merchandise to which such label is to be affixed are sequentially printed upon key actuation.

The labels themselves may be fluorescent while the data markings are printed in nonfluorescent black to increase contrast. Unit 401 could also be a machine or computer controlled unit responding to particular signals and operating printing unit 402.

As stated above, the invention relates to equipment for processing such data field at readout. Turning back to FIG. 1, for practicing the invention it is not necessary that these data fields 40 have particular position on the packages 12, except that such data fields should be on a surface of a container which faces in one direction, for example, up, so as to face the readout equipment.

It is not necessary that the items 12 themselves have particular position on the conveyor belt 10 in lateral, as well as in longitudinal direction, as far as direction of transport movement is concerned. In particular, the items 12, and, therefore, the data fields on them, do not have to be regularly spaced along the conveyor belt, nor do they have to travel in an aligned relationship, i.e., the data field centers do not have to travel on a line during transportation by and on conveyor belt 10. Finally, it is not required that the packages are of equal height so that the data fields do not have to travel within a particular plane only. For the same reason, the data fields do not have to have equal size, as the reading equipment is not dependent upon fixed object size and object distances as far as image production to be described next is concerned.

As conveyor belt 10 moves, the packages with data fields thereon will pass through an inspection zone or search field 15. The center of this inspection field may be defined by an optical axis 20. The inspection field is optically defined as to its aperture by optical and electron optical equipment disposed along the optical axis 20. Additionally, or in the alternative, the search field 15 may be defined through illumination or that even from a source 13.

The illumination source 13 is preferably a pulsating one, either because an alternating or pulsating voltage drives the source or by operation of a light chopper. A detected reflection of such pulsating illumination includes the pulsations as a carrier frequency signal, and contrasts in the region observed by the optical equipment on axis 20, particular markings in a data field, appear as and are represented by particular modulations of such carrier frequency signal.

A mirror 21 may be provided to redirect the optical axis, as the optical equipment will be disposed in a horizontal orientation, which is basically immaterial. A lens system 22 images the search field 15 which may, therefore, be defined by the effective aperture of the optical system as defined by mirror 21 and lens 22.

The image converter 25 can be of general construction, and it includes an exit or target screen 26 onto which an image of the search field or a portion thereof is produced. The image converter 25 is presumed to be an electron optical device, permitting lateral deflection of the electrons producing the image and, therefore, of the image itself. The tube includes, for example, two pairs of deflection electrodes; there is pair 27 for vertical deflection and a pair 28 for lateral deflection of the image as produced onto screen 20. These directions of deflection could be, but do not have to be, associated, through the optical path along axis 20, with longitudinal and lateral directions of the conveyor belt 10 and with the respective movement of data fields through the search field. In the following, it is presumed that horizontal deflection corresponds to the longitudinal direction of data field travel on belt 10, the vertical deflection then corresponding to the transverse displacement direction on the belt. Generally speaking, the two deflection systems, 27 and 28, provide lateral image deflection in the image plane of tube 25 and in two orthogonally oriented directions.

The target screen 26 or exit window of the image converter 25 is provided with a recognition device 30 for detecting the position of the data field image on screen 26. As illustrated in detail in FIG. 3, the recognition device has four sector-shaped quadrants, sensors or sensing electrodes 31, 32, 33 and 34 essentially covering the target screen 26. If the area covered and outlined by those four quadrants is smaller than the aperture of the system 21 and 22, for zero deflection of the image by operation of the electrode system as projected on screen 26, then the inversely projected target screen 26 onto the conveyor belt area defines the search field thereat.

Screen 26 as covered by quadrants 31 to 34, does not have to be provided with a fluorescent layer, or the like, in order to reconvert the electron-optically produced image on screen 26 into visual image. Instead, the detector system 30 on screen 26 is provided in the form of electrodes for detection of the electron optically produced image of the search field on screen 26.

As shown in FIG. 3, this detection system 30 includes the sector-shaped electrodes 31, 32, 33 and 34, and it is immaterial in principle whether the outer boundary of each sector is a straight line (so that they form a square) or curved (so that the form a circle). Each sector has a cut-out near the inwardly directed apex to define a circular area 35. It is a principal function of detection system 30 to control the image deflection system of tube 25 such that any data field image, as projected onto screen 26, registers with the circular area 35. The four quadrant sections 31 to 34 are organized symmetrically in pairs, whereby the directions of image deflection by the two electrode systems 27 and 28 define these axes of symmetry. Electrodes 31 and 33 have the vertical as axis of symmetry for controlling image deflection in the horizontal corresponding to longitudinal propagation of data fields on the conveyor belt. Electrodes 32 and 34 are disposed orthogonally thereto, and corresponding to a lateral displaced position of a data field and in relation to the horizontal axis on screen 26.

The preferred format of data encoding will be discussed more fully below. Nevertheless, it is apparent from comparison of FIGS. 2 and 3 that centering of the image of the data field requires the image of track center 42 to coincide with the center of area 35 which is also the center of the recognition device 30.

Turning now to the control device as connected to the detection system 30, it is the function of that control device to bring about centering of a data field image as soon as the data field has entered the search field. The circuit includes a-c signal processing means 50 which as shown in FIG. 3, includes a-c amplifiers 51, 52, 53 and 54, as respectively connected to the electrode 31 through 34. These amplifiers 51 through 54 are tuned amplifiers, preferably narrow bandwidth amplifiers, with a tuned frequency equal to the pulsation frequency of the illuminating source 13. This way, signals having components other than the a-c component attributable to the illuminating source are rejected to improve the noise rejection capabilities of the system.

A logic circuit 55 is connected to the a-c processing circuit 50 and may include the logic circuit elements symbolically indicated in FIG. 3. It is presumed that the amplifiers 51 through 54 provide rectified outputs so that the output signals can be regarded as logic signals. For the following description it is assumed that a true signal is produced by such an amplifier in case the electrode to which it is connected detects and responds to the image of or portion of an image of the data field.

A gate 56 has a direct input connected to amplifier 52, and an inverting input of gate 56 is connected to the output of amplifier 54. Gate 56 provides a true output signal in case the image or a portion of the image of the data field is on electrode 32 but not on electrode 34. A gate 57 is connected to respond if the inverse is true. Analogously, a gate 58 has one direct and one inverting input respectively connected to amplifiers 53 and 51 to respond if the image or a portion of the image of the data field is on electrode 33 but not detected by an electrode 31. The inverse is true for response of a gate 59.

The electrode system 27 of the image converter tube 25 is controlled by a suitable control system 61 to provide electron image deflecting voltages in response to input signals derived from appropriate detecting voltages. This deflection system for vertical image deflection, as controlled from device 61, is now associated through a suitable connection to the two gates 56 and 57 in logic circuit 55. In case one or the other of the two outputs of gates 56 and 57 are true, electrodes 27 cause the image to be deflected in upward or downward directions. Analogously, the horizontal deflection system 28 is controlled through device 62, providing suitable voltages for the electrodes 28 for horizontal image deflection and in response to the signals provided by the gates 58 and 59 in logic circuit 55. In case one or the other outputs of gates 58 and 59 is true, the image of the data field as projected on the screen 26 is deflected horizontally to the left or to the right.

The control devices 61 and 62 provide integrating control in that, for example, as long as the output of gate 56 remains true, the deflection provided by control device 61 as operating electrodes 27 increases, tending to continue to shift the image down. As soon as the output of gate 56 goes false, the deflection system will hold the image in the attained position. Should gate 57 now turn true, control 61 will tend to move the image up again. The output of gates 57 and 56 will also turn false either if the outputs of amplifiers 52 and 54 are both true or both false. The resulting control for these cases is not related to image position but image size. Control of the deflection system 28 in response to signals from gates 58 and 59 is an analogous one.

Due to the fact that each data field enters the search field at a random position and orientation, the data field can generally not be expected to pass with its center 42 through the optical axis 20 as projected into the search field area. It follows, therefore, that for zero image deflection as provided by the electrode systems 27 and 28 in tube 25 in the quiescent state, the image of a data field entering the search field will be projected onto the detector electrode or quadrant observing the leading portion of the search field; this, for example, may be electrode 33. The resulting change in output signals of recognition device 30 begins to control the deflection system of tube 25 such that the data field image will become centered in the circular area 35. At first then, the output of gate 58 will turn true causing network 62 to run up deflection system 28. This, in turn, will involve a rather rapid horizontal deflection of the image to place the image symmetrical between quadrant electrodes 31 and 33. Due to possible lateral displacement of the center 42 of a data field as traveling through the search field, the horizontally deflected image will appear on one of the quadrants 32 or 34, and the vertical position control 61–27 will deflect the image vertically to finally center it in area 35.

In view of the fact that an electron optical system and an electronically controlled deflection system is used, it can readily be assumed that the image centering operation, as controlled through this system 30 – 50 – 55 operates considerably faster than the speed of the conveyor belt 10. Therefore, the control system, as described, operates follow-up control, causing the image of the data field to remain centered even though the data field on a package, or container, moves through the search and inspection field 15. In other words, the control operates much faster than the image of the data field tends to escape from the centering position, so that within these tolerances the data field image remains centered in spite of the continued motion of the data field proper through the search and inspection field.

In view of the fact that the object distance is not necessarily a fixed one, the image of the data field as projected onto the screen 26 and particularly on the recognition device 30 thereon, may vary in magnification. For example, a gate in the form of a four-input AND gate 63 is connected to all amplifiers 51 through 54. Gate 63 responds if all of the detectors 31 through 34 detects an image or a portion of the data field, which is an indication that the data field image is too large to fit into area 35. Conversely, a four-input NOR gate 64 is likewise connected to these amplifiers 51 through 54 and it responds if none of the four detectors 31 through 34 detects a portion of the image of the data field, which is an indication that the image is too small.

The gates 63 and 64 are included in the logic circuit 55, and they control the magnification of the lens system 22 which may be provided in the form of a power driven zoom lens. In particular, the two gates 63 and 64 control a reversible motor 65 in one or the opposite direction to operate zoom lens 22 for increase or decrease of image magnification.

It can, therefore, be seen that by operation of the several gates included in the logic circuit 55, the image of a data field once detected is deflected to become centered in the circular region 35 at proper magnification. In that position of the image the data readout process can begin.

The circular area 3 5 is, as far as the recognition device 30 is concerned, an open passage. However, as far as screen 26 is concerned, it may be provided with a layer of fluorescent material. Therefore, an optically detectable, visible image of the properly centered data field is produced within that area 35 on screen 26. An optical system 70 provides an image of that data field in a particular plane. The optical system 70 includes a dove prism 71 rottable about its axis, particularly about the axis of optical system 70 and by operation of a motor 72. Therefore, the image of the data field as produced by optical system 70 is rotated in the image plane of system 70. It is, furthermore, presumed that the axis of rotation traverses the center of the field 35 so that a properly centered image of the data field in the image plane of optical system 70 rotates around the image of the center 42 of the data field.

A pair of photoelectric detectors 73 and 74 is positioned in the image plane of system 70 and on a radial line with regard to the point where the optical axis of system 70 traverses the image plane thereof. These two photoelectric detectors 73 and 74 have distances from that center equal to the respective distances of the image of tracks 43 and 44 from the center of the data field 42 (multiplied by the magnification factor of the entire imaging system). Therefore, as the image of the data field rotates about this center, photoelectric detector 73 and 74 scan the two data tracks 43 and 44 (or, more precisely), images thereof).

It follows, therefore, that the readout process can begin as soon as the data field image, electron optically produced, is centered in area 35, so that the image as produced by optical system 70 is properly centered in relation to data readout detectors 73 and 74. It will become apparent, however, that a particular instant for the beginning of the readout process of the data field does not have to be marked, because an improperly positioned data field image will produce immediate error situations in the readout circuit. Nevertheless, the logic circuit 55 may be coupled to the readout and readout signal processing circuit 100, in such a manner that at least a coarse adjustment of the image of the data field is already present before the readout process begins. Such a signal may be produced by logic 55. For example, at the instant all of the outputs of gates 56, 57, 58 and 59 go false again after at least one of them had turned true is an indication that the image positioning operation approaches proper centering. Alternatively a coarse adjustment is present also as soon as the output of gate 63 turns false coinciding with the turning true of gate 64, or vice versa. Either of these situations indicate that the coarse lateral adjustment process has been terminated, and that fine and follow-up control or fine magnification adjustemnt has taken over, which occurs if the image of the data field is, in fact, at least roughly centered.

As indicated schematically in FIG. 1, proper position or coarse adjustment of the position of the data field image is signaled by unit 55 to a read control flip-flop 80, which, when set enables readout circuit 100. After completion of data readout and processing the flip-flop 80 is reset. The signal which resets the flip-flop 80 and which is developed internally in readout processing unit 100 can also be used to reset image deflection controls 61 and 62 to assume starting or resting position. Alternatively, resetting of controls 61 and 62 may be caused automatically as soon as the data field leaves the search field and/or one of the deflection controls have reached limit position. Still alternatively, resetting of controls 61 and 62 may not be provided for at all so that each detection process begins with a random state of the deflection system. Resetting of the deflection control into a zero position is advisable or even necessary only if the data field carriers move rather rapidly so that the data fields are in the search field for a period of time which is not too much longer than the period needed for readout in, say, at least two readout cycles.

Figure 4:
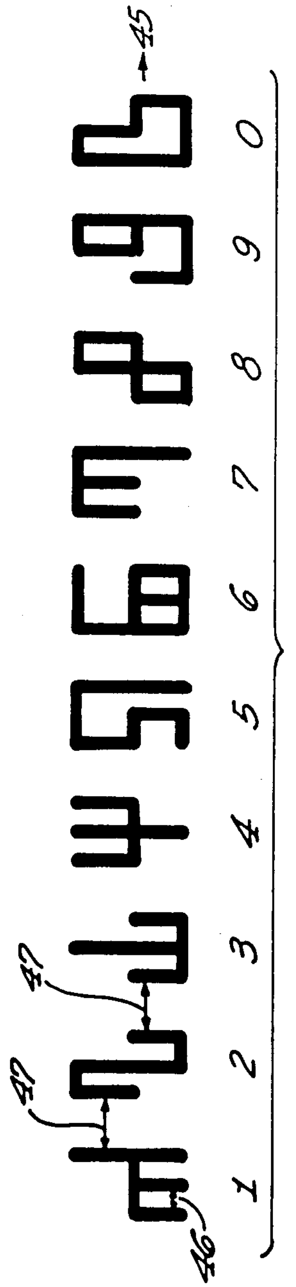
FIG. 4 illustrates examples of a particular code and presentation thereof within a data field of the type, for example, illustrated in FIG. 2.
Figure 5:
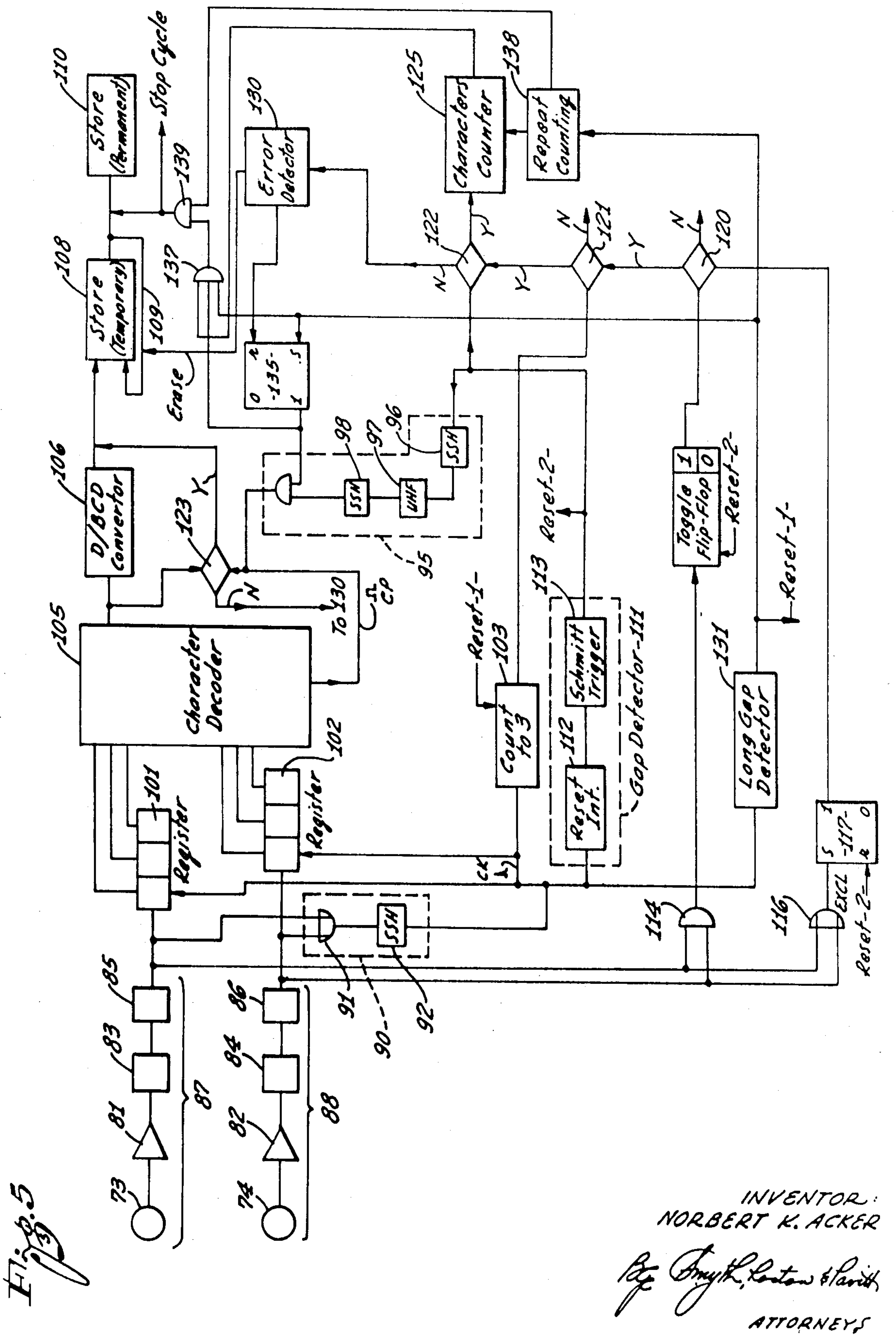
FIG. 5 illustrates somewhat schematically a circuit and block diagram of the readout signal processing the circuit in FIG. 1, usable in case a recording format is used as shown in FIG. 4.

Before describing examples for the readout circuit as shown in FIG. 5, a first code involved will be described with reference to FIG. 4. FIG. 4 illustrates the development of the two tracks 43 and 44 and in an assumed situation where the data field contains all the digit numbers 1 through 0. The content of a data field will collectively be called a data word comprised of one or more characters. Each character has the following generic characteristics in principle.

First, each character is defined by six bits arranged in pairs, each pair constituting a sub-character and established by two bits in parallel on the two tracks, there are accordingly three such sub-characters per character. Thus, each character is defined by an assembly of bits, which can be defined as serial and parallel-by-bit. Second, in each of the three sub-characters as defining a character, there is at least one bit of value "one."

Third, each character has four contrasting marker bits, the remaining two bits providing none, less or difference contrast in relation to the background of the data field carrier. Constructing a contrast producing marker bit as a bivalued bit of value 1, it follows that in the particular code, as chosen, each character has four one bits and two zero bits. A character as a whole, therefore, has a code with even parity.

Fourth, a distinction is made between character and sub-character spacing in the recording, as the recording format is serial-by-character and serial-and-parallel by bit within each character, so that it is necessary to distinguish the serial bit spacing within a character from serial bit spacing between two sequential characters which distinction is necessary to permit separation of characters.

The reason for choosing such a code generally is to permit ready distinction of intelligence from noise. More particularly contrasting patterns which may enter the search field and which may have appearance similar to a data field have to be prevented from being regarded as information. Therefore, a very accurate checking of the format of the signals as read by the detectors from the image of a data field is instrumental to determine that signals read and assembled as a character constitute, in fact, a legal character; otherwise, whatever is being read out but fails to pass these tests is rejected.

Looking at FIG. 4, one can readily see that the positioning of "one" bit on the tracks as contrast producing markers, is such that with the aid of bar sections along the tracks and which do not pertain logically to the encoding, code combinations can be selected and assigned to the several decimal digits which, with some imagination, resembles at least in part, the contour of such decimal digits. This makes it possible that the code is not just machine readable.

The development of the data proper, as shown in FIG. 4 reveals the following additional characteristics. The bits defining the several characters are placed on the two tracks around the center of the data field in such a manner that along each track between two succeeding bits there is a particular first spacing denoted with reference numeral 46. In view of the fact that the two tracks are read out concurrently, it follows that during readout of each character, there must be at least one bit value of "one" read from the two tracks for altogether three bit periods to constitute a character. In between characters there is at least a larger spacing or character gap 47 having value, for example, of two or three bit spacings 46, logically definable, for example, in that following three subcharacters recognized as such, zero bits are read from both tracks or a gap in excess of a normal within-character bit spacing is detected. Additionally, the data field includes the large gap 45, already mentioned above, which permits recognition of the beginning or end (depending on the sense of rotation) of the entire information field within the data field.

With these preliminary remarks, we now proceed to the description of the readout and evaluating circuits shown in FIG. 5. The circuit has the two photoelectric detectors 73 and 74 as input elements. These elements are respectively connected to preamplifiers 81 and 82 which, in turn, connect to tuned amplifiers 83 and 84 for similar reasons mentioned above so as to restrict response of the detection system to reflected illumination signals having the frequency of the light source. The rotation of the data field image is effective as modulating the carrier frequency with the bit race frequency as determined by the bit spacing 46. The information band to which amplifiers 83 and 84 must be tuned is thus the pulsating illumination frequency plus, minus the ratio of (angular) bit spacing 46 over the rotational speed of the data field image. The a-c circuits 83 and 84 may, in addition, include demodulators, low pass filters or narrow band filters in order to render the system particularly responsibe to the bit frequency as resulting from rotation of the image field by operation of rotating dove prism 71.

Pulse shapers 85 and 86 respectively connect to the output side of the a-c network 83 and 84 to provide logic signals in representation of the bits as detected and read from the two tracks. The logic signals provided by the pulse shaper vary between two levels, one of them representing bit value "one" for a contrasting bar on a track. A different level at the output of one of the two pulse shapers at a time the other one holds and provides a "one" output is then interpreted as a zero bit, as each sub-character has by definition at least one "one" bit. To facilitate further description, elements 73, 81, 83 and 85 are collectively called data read channels 87, with the output of pulse shaper 85 serving as output of the data read channel 87. Elements 74, 82, 84 and 86 are collectively called data read channel 88 with the output of pulse shaper 86 serving as output of data read channel 88.

In view of the chosen recording format, the system is made self-clocking. For this purpose a clock pulse generator 90 is connected to the output side of the two data read channels 87 and 88. The clock generator 90 includes an OR gate 91 connected to data read channels 87 and 88 so that the system operates with what is usually described as an "OR'd clock." A monostable multivibrator or single shot 92 connects to the output side of the OR gate 91 having an astable period below the width of each data bar in the data field image divided by the rotational speed of the image field at the respective track. The output of the monovibrator 92 serves as clock pulse train of the system and particularly the trailing edge of the multivibrator output pulse serves as the clocking signal of the system (falling clock trigger).

The two data read channels 87 and 88 connect to a pair of shift registers 101 and 102 respectively, receiving the clock pulses CK from generator 90 as shift clock pulses, to clock the data bits, as supplied by the data read channels 87 and 88 into the shift registers 101 and 102 respectively. The registers 1o1 and 102 can be regarded as character assembly registers and each may have three stages to receive the three bits as pertaining to each character on each track. The normal data transfer system includes a counter 103 which also receives the clock pulses CK to count the number of sub-characters. Counter 103 is a recycling counter for counting up to count number 3, and being reset to count zero upon reaching the count 3 state.

As was stated above, characters are separated by a gap 47 which is larger than the bit gap 46 within each character. A character gap is detected by a first gap detector 111, which, for example, includes a reset integrator 112 triggered anew with each clock pulse CK and feeding its output to a Schmitt trigger 113. The clock pulse rate within each character is selected such that the reset integrator 112 does not reach trigger level of the Schmitt trigger 113 as long as clock pulses CK are spaced (46) corresponding to the sub-character spacing within each character. Thus, Schmitt trigger 113 and, therefore, the gap detector 111 does not respond during reading of a character. However, the timing of reset integrator 112 with regard to response level of Schmitt trigger 113 is adjusted such that the Schmitt trigger 113 will respond if there is a character gap, i.e., the period of response of gap detector 111 is somewhat longer than the period defined by subscharacter gap 46 but shorter than the period defined by the character gap 47.

Each time detector 111 detects "gap," the rising flank of Schmitt trigger 113 triggers a character clock 95 which produces an output pulse CP as an indication that a legal character has been assembled in registers 101 and 102. As will be described below, pulse CP is produced only if the signals fed into character assembly registers 101 and 102 have passed certain tests. Each time a character has been assembled in registers 101 and 102, a clock pulse CP strobes a six input character decoder 105. This decoder 105 has its six inputs connected to six stages of the two character assembly registers to decode the six bits held in the registers at that time and in accordance with the code pattern as shown in FIG. 4.

For example, if the three stages from left to right in register 101 hold respectively (0–0–1) and the three stages of register 102 holds bits (1–1–1), the decoder detects a decimal "one." Accordingly, decoder 105 has 10 output channels connected to, for example, a decimal-to-binary-coded decimal-converter 106 (or D/BCD converter for short) and a character pulse CP serves as gating signal to feed the BCD reencoded character into a temporary storage device 108.

Device 108 may be a recirculating delay line or shift register which includes a recirculation path 109 for holding the sequentially read BCD reencoded characters through cyclic storage, and until transfer is permitted to a permanent storage or registration device 110, such as a tape recorder, disc file, card punch, printer, or the like. The temporary store 108 can also be called data word assembly register storing BCD representations of the data word. Ultimately, transfer from temporary to permanent storage is permitted only after all of the several characters as read from the data field image have passed the several format tests, and after they have been stored in data word assembly register 108 in the particular sequence in which they have been read.

With this I proceed to the description of the character format checking equipment included in the system shown in FIG. 5. This format checking, as stated above, requires that each of the three sub-characters per character has at least one digit of value "1," and that each character has four "ones," no more and no less, and that a character has, in fact, only three sub-characters, no more no less.

And AND gate 114 is connected to the two data read channels 87 and 88 to respond to the situation that the sub-character has two "ones." In view of the four-out-of-six encoding format this must occur once and only once within each character. This output of gate 114 sets a toggle flip-flop 115. Assuming at the beginning of reacting a character, the toggle flip-flop 115 is in the reset state, it follows, therefore, that it must be in the set state at the end of reading a character. If it is in the reset state, then either there was no sub-character with two "ones" in the character just read, or there were two of them.

On the other hand, flip-flop 115 could be in the set state also if all three sub-characters have two "ones." That latter situation is likewise an error situation and is detected by operation of an exclusive OR gate 116 connected with its two inputs to the two data read channels 87 and 88 to set a regular flip-flop 117 whenever discovering at least one sub-character with only one "one." This should occur twice.

It should be mentioned that the tests conducted through elements 114, 115, 116 and 117 are redundant if the decoding by unit 105 is complete, i.e., if for each decimal character to be detected, all six stages of character assembly registers 101 and 102, set or reset output sides thereof as the case may be, are used as inputs for the decoder and if the output of the decoder is checked as to the presence of response at the time of a character pulse CP. The decoder must raise one, and only one of its ten output lines in response to a character pulse CP. On the other hand, the tests conducted through employment of these elements 114, 115, 116 and 117 permits simplified decoding, such as using only the four one-defining inputs per decimal character. In other words, the fout-out-of-six format test may be included in the decoding of conducted separately or additionall, and either of the two latter cases is assumed here.

Proceeding now to the sequence of tests as conducted by operation of the circuit illustrated, a first decision unit 120 checks concurrence of set states in flip-flops 115 and 117. A second decision unit 121 checks whether unit 120 provides a "yes" at time counter 103 as been recycled to count state zero. Unit 121 provides "yes" signal as long as, but only as long as, counter 103 is in the count state "zero." The next decision is made by testing unit 122 which tests whether a "yes" signal provided by 121 (if provided at all) is still true by the time gap detector 111 responds and detects a character gap. This will not be the case if a character had less than three or more than three sub-characters or more or less than four "ones."

Unit 122 provides a "yes" signal only if all these tests have been completed successfully. In other words, a "yes" output of unit 122 indicates that the character now assembled has three subcharacters which included four "ones" and with the proper spacing among the subcharacters, to be recognizable as such. A "yes" signal from unit 122 increments a character counter 125 counting the number of correct characters which have been read.

A "no" signal by test unit 122 is a particular trigger signal provided by unit 122, particularly when the gap signal from detector 111 finds a "no" state (false output) of test unit 121. This "no" signal of unit 122 is developed as a particular trigger signal at gap detection to trigger an error detector 130. The error situation can be handled in various ways; in the illustrated embodiment it is suggested that upon detecting a format error, detector 130 opens the recirculation loop 109 of temporary store 108 to erase the content thereof. In addition, a process control flip-flop is reset. The process control flip-flop 135 controls the character clock 95.

As was stated above, the gap detector response (rising output of Schmitt trigger 113) triggers the character clock 95. In particular, that rising flank triggers a single shot 96, which, in effect, operates as delay element. The single shot 96 has only a short astable period and the trailing edge of its output triggers another single shot 98 via a polarized fifferentiating circuit 97. A gate 99 passes the output of single shot 98 as character clock CP provided process control flip-flop 135 is still set at that time. If there was a "no" signal from unit 122 at the time of gap detection, flip-flop 135 is already in the reset stage by the time of response of differentiator 97 and the character clock pulse CP is not produced.

The final character format test is conducted at the output side of decoder 105 by a test unit 123, testing the presence of one output signal in one of the ten output channels of decoder 105; a character which has passed the several tests may still not be a legal character. A "yes" representing output of test unit 123 permits utilization of the character pulse CP (assumed to have duration beyond settling time of decoder and test unit) as enabling signal for the transfer control circuit between D/BCD converter 106 and store 108. A "no" representing output of test unit 123 blocks such transfer and instead sets error detector 130 which, in turn, resets process control flip-flop 135. It can thus be seen that in fact a character is clocked out of registers 101 and 102 and set into store 108 in a different code only if the several format tests have been passed.

Control flip-flop 135 is set by an output signal from a long gap or data gap detector 131. The long gap detector may include a reset integrator and a Schmitt trigger such as in gap detector 111, except that the rise time of the reset integrator and/or the response level of the Schmitt trigger in detector 131 are/is adjusted to define a longer period than the character gap period as defined by gap 47, but shorter than the period as defined by the data gap 45. Of course, the gap detector 131 receives the clock pulses CK to be reset with each subcharacter; alternatively detector 131 could receive the character pulses CP.

Data gap detector 131, in effect, when responding and upon providing an output signal, establishes therewith a phase signal which defines a waiting period immediately preceding the first character of the dataword in the rotating data field image. Conversely, of course, if data gap detector 131 responds and if there was a previous response of gap detector 131, the entire data field has been read with the second data gap detection. From a different point of view, dequential pulses provided by the data gap detector 131 define the repetition rate of the data field image rotation and presentation for readout thereof, and in between two such pulses the entire data field is being read.

The process control flip-flop 135, as mentioned above, is controlled from the long gap detector 131, which means that flip-flop 135 will enter set state the first time long gap has been detected. In this way, the character assembly system synchronizes with the beginning of information in the data field. Any information which registers 101 and 102 and the other circuits may have received will not have been evaluated, as there are no character pulses CP during long gap. The system could be designed that the output signal, particularly the set state output signal of flip-flop 135, is used as a gating signal for all of the circuit elements as described and as connected to the data read channels 87 and 88 except for the clock pulse generator 90 and the long gap detectors 131.

It follows, therefore, that the readout process, or more precisely, the readout signal decoding and evaluating process begins with long or data gap detection, by detector 131, causing process control flip-flop 135 to set and now sequential characters are tested, decoded and stored in the store 108 as long as no errir is being detected. If an error is detected, the detector 130 responds and resets the flip-flop 135 which interrupts the readout signal evaluation process until the rotation of the data field has progressed so that again the long gap is being detected and another readout cycle can begin. One can, therefore, see that readout cycles can be repeated until a cycle has been completed without error. A readout cycle is completed without error if, at the time a long gap is detected, process control flip-flop 135 is still in the set state. An AND gate 137 responds to this situation provided character counter 125 has reached the particular number of characters per data word which, in essence, is a test as to the data word format, and controls the transfer of data from the temporary store 108 to the permanent store or registration device 110.

It may well be desirable to conduct the readout process repeatedly and it may also be desirable to abandon the readout process if, after several readout cycles, none could be terminated without error. For this there may be provided a repetition counter 138 controlling, for example, a gate 139 to permit transfer of data between stores 108 and 110, only after a number of repeated correct readout processes (gating through flip-flop 135). For a different counter number, the repetition counter 138 may provide a particular indicating signal in case none of these readout cycles could be completed without error.

The output of gate 137, or of gate 139 if used, will be used further to stop further processing of the particular data field, causing read control flip-flop 80 to be reset to zero (see FIG. 1). Finally, it should be mentioned that the long or data gap detector 131 may produce a reset signal for the counter 103 to set the counter to count state zero, which signal is designated in FIG. 5 as "reset 1." The short gap or character gap detector 111 may always force toggle flip-flop 115 inti the reset state and provide a regular resetting of flip-flop 117. This reset signal is labeled "reset 2" in FIG. 5.

The code and format checking could be conducted differently, for example, special gating circuits can be connected to the output side of the several stages of registers 101 and 102 in order to detect presence of no more, no less, than four "one" digits in the altogether six stages, or gating circuits responding to presence of two "zero" digits, not more and not less, in each character can be connected.

Figure 6:
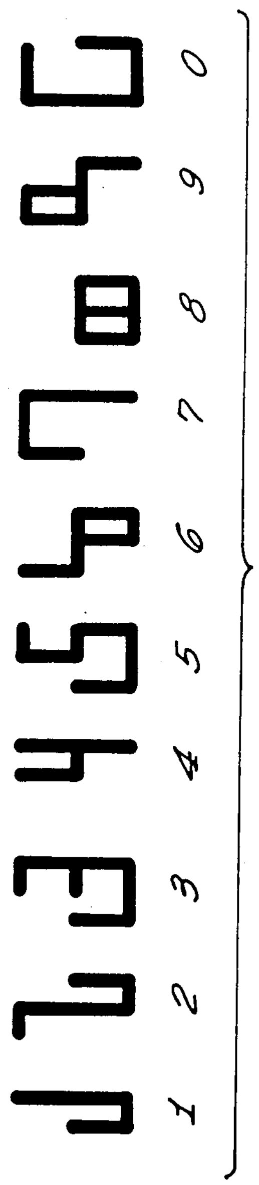
FIG. 6 illustrates schematically a different character encoding format.

FIG. 6 illustrates a different code which lends itself to man-and-machine readability with feqer limitations. The code uses also two data tracks in the data field as afore-described. The code can be described as a three-out-of-six code. The characters each have three bits of value "one" and three bits of value "zero." For each character there are also six bit positions, three serial subcarriers of two bits in parallel each. This code has an additional restraint in that not all three subcharacters have to have at least one "one" digit, i.e., a character can have an all-zero subcharacter. As a consequence, the subcharacter cannot be defined any more by sequentially "OR'd ones."

Since the gap between two characters should not exceed two subcharacter gaps, for reasons of economic use of the available recording space, character and subcharacter differentiation cannot be carried out, as was shown and described.

Figure 7:
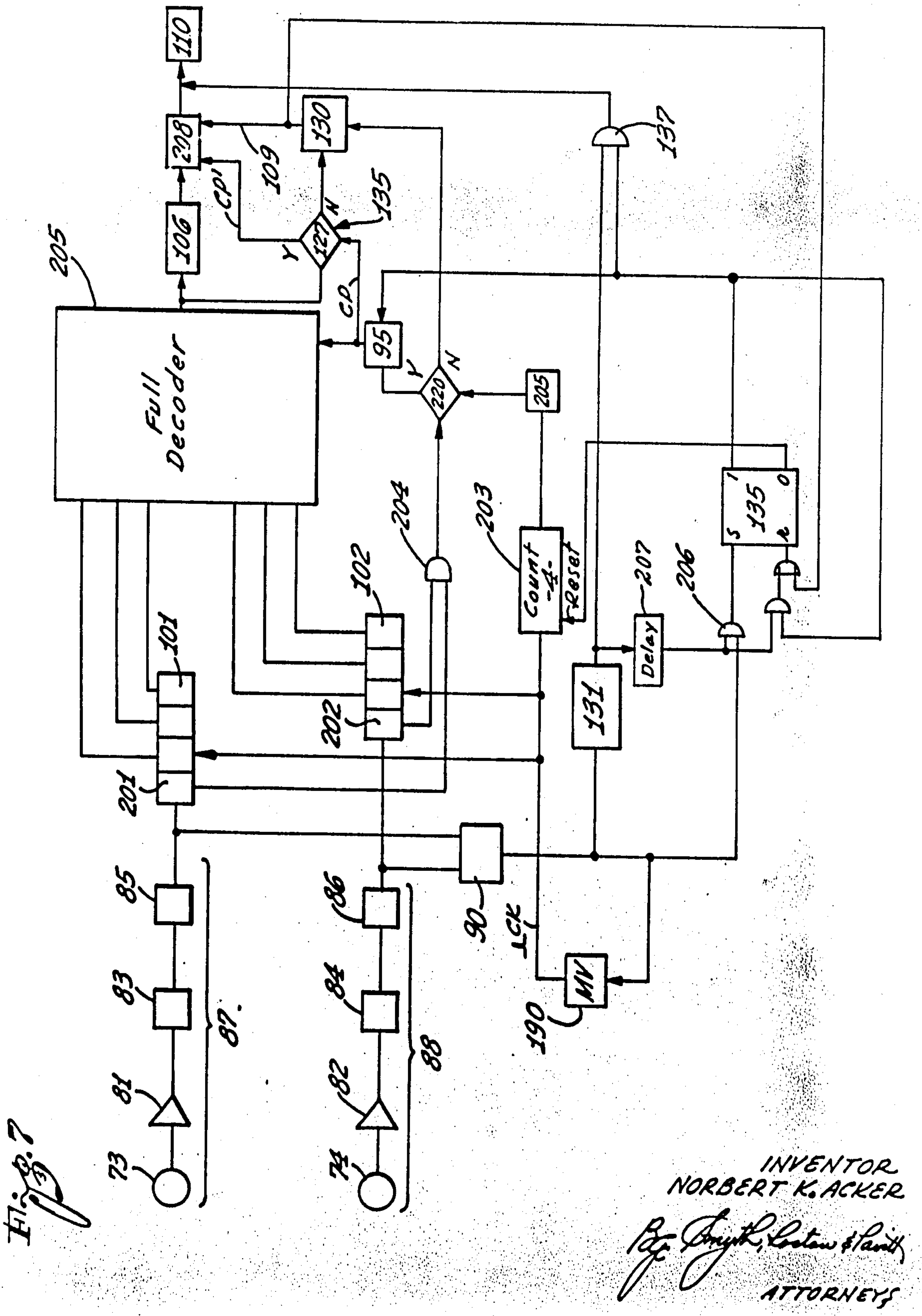
FIG. 7 illustrates a readout circuit for use if data field encoding is chosen as shown in FIG. 6.

Turning now to FIG. 7, specifically, the elements 73, 74 and 81 through 88, correspond to those in FIG. 5. Also, elements 90, 106, 108, 109, 110, 131, 135 in FIG. 7 have counterparts of like designation in FIG. 5, though in parts, inputs and/or outputs are used differently. There is also provided the pair of registers 101 and 102, except that they are enlarged by what can be described as prestages, denoted respectively 201 and 202 to form four stage character assembly registers, each corresponding to the three subhcaracter plus character gap stage. Register portions 101 and 102 are still the character assembly stages, but for proper assembly a character gap is detected as part of the character assembly process. Thus the two assembly registers are enlarged so as to detect gap by detecting an all-zero subcharacter succeeding three subcharacters proper pertaining to a character. From a different point of view, each character can be regarded as being constituted by four subcharacters of two bits each, wherein the last subcharacter must have two zero bits.

The data read channels 87 and 88 respectively connect to stages 201 and 202. The OR'd clock connects also to the data read channels 87 and 88 but is not used in the manner as was described above with reference to FIG. 5. Instead, there is provided an oscillator 190 such as an astable multivibrator, or a voltage controlled oscillator, or any other suitable oscillator, having frequency equal to the bit frequency as it passes the photoelectric detectors due to data image rotation. Actually, this device 190 may be locked to the motor 72 driving dove prism 71 for image field rotation (or the motor 72 may be synchronized with oscillator 190). For fine control, the OR'd clock is connected to oscillator 190 so as to force oscillator 190 into a particular phase position at the time of a rising signal flank of an OR'd clock pulse.

The oscillator 190 produces clock pulses CK as they are normally used within the system, and detection of the OR'd clock pulses merely serves as an occasional phase correction to maintain the system locked to the readout. It should be mentioned that such a clocking system could also be used in the system of FIG. 5. The pulses CK function as shifting signals to clock the data read from the tracks into the input stages 201 and 202 of data assembly registers 101 and 102 for controlling passage of the data into and through these registers. In addition, clock pulses CK are fed to a count-to-4 counter 203. The counter recycles in that it resets to zero upon reaching count state 4. A count state zero detector 205 is coupled to counter 203.

Assuming for the moment that the phase of cyclic counter operation has initially been established properly, it appears that upon being reset to count state "zero" counter 203 indicates that the two registers 101 and 102 hold data bits of a character and that the two leading stages 201 and 202 should hold two zero bits corresponding to the gap succeeding the character which has just been read.

A NOR gate 204 is coupled to the stages 201 and 202 and therefore, provides (or should provide) a true output signal during count state zero. A decision and testing circuit 220 receives the output of count state zero detector 205, as well as the output of NOR gate 204 in order to probe whether there is a character gap defined by an all-zero subcharacter in stages 201 and 202. A "yes" output of testing unit 220 operates as trigger signal for character clock 95 to produce the character clock gating and strobing pulse CP to operate a decoder 205. If the test conducted by device 220 results in a "no" output, error detector 130 is triggered as aforedescribed.

It is assumed that decoder 205 is a full and complete decoder within ten different output elements corresponding to the ten decimal digits to be decoded. Each of these ten output elements is connected to all six stages of character assembly registers 101 and 102, set or reset output sides, as the case requires. Therefore, the decoding includes a format check because in case of an illegal or incomplete character, none of the output elements of the decoder will respond to produce an output. Hence, a testing unit 127 which includes a ten-input OR gate is coupled to the ten decimal output lines of decoder 205 to determine whether a legal character is decoded at the time of a gating signal CP.

If the answer of test unit 127 is an affirmative one, a transfer control signal CP' is provided to cause the D/BCD converter 106 to transfer the newly formed character in BCD format to temporary store 108. If any output is not provided by decoder 205 at pulse time CP, error detector 130 is triggered as heretofore described. The error detector 130 resets the process control flip-flop 135 which, if reset, inhibits production of the next character clock pulses CP, also as aforedescribed.

The system can be made self-synchronizing in a simple manner if one observes the restraint that the first character is not a decimal "one" or a "four" or if the data field rotates such that the data field is always read in the reverse. In other words, and for simplifying operation there should be the requirement that the first character read after a large gap has in the sub character's position read first at least one digit of value "one." Using this restraint, which is of no consequence in principle, one can see that the process control flip-flop 135 is set, as the system leaves the gap state, by the first data clock signal from OR clock 90. A gate 206 is connected to data gap detector 131 via a delay circuit 207 to provide a delayed enabling signal to gate 206 in response to data gap detection. The output sets control flip-clop 135. Process control flip-flop 135 is reset by an error signal, or by a data gap signal and when in the set state, whichever occurs earlier.

When in the set state, flip-flop 135 or flip-flop 80 enables particularly the test equipment 220 and 127, but flip-flop 135, when reset, disables particularly device 220 so that even though counter 203 is forced to stay in count state zero as long as flip-flop 135 is not set, the character pulses CP cannot be produced.

In order to maintain the system in a quiescent state, clock pulses CI may always be gated by a set state signal of flip-flop 135 and/or by a set state signal or flip-flop 80. The system is adjusted so that the effective edge of clock pulses CK occurs always slightly after an OR clock signal from the data clock 90, to permit counter 203 to shift to the count state 1 with the first subcharacter read and as the data is shifted into stages 201 and 202. As can readily be seen, the system then proceeds in proper synchronism. After four clock pulses CK, a character is in assembly registers 101 and 102 while a character gap signal (two zeros) is in stages 201 and 202. The readout processing proceeds cyclically per character until the large gap or an error is detected, and operation continues in the same manner as was described above.

If, at the time of gap detection, control flip-flop 135 is still in the set state, the gate 137 responds to cause transfer of all reencoded characters from temporary store 108 to permanent store 110. Cyclic repetition of the reading and decoding operation can, of course, be had as was described above.

The invention is not limited to the embodiments described above, but all changes and modifications thereof not constituting departures from the spirit and scope of the invention are intended to be included.

I claim:

1. Apparatus for reading information established by a data field on a carrier, the data field identifying the carrier, the carrier appearing in random position, orientation and time in a particular area, the data field having two tracks extending in parallel, the tracks holding contrasting markings, extending transversely to the extension of the tracks;

the markings organized in characters, there being a constant number of individual markings per character and six positions for holding markings per character, the positions and markings therein spaced in the direction of track extension a contour marking extending along the tracks and defining the location of the data field on the carrier, the combination comprising:

first means defining an optical path between the particular area and providing an image of the area and of a data field with its markings when in the area, the first means including adjusting means for displacing the image laterally in two transversely oriented directions and rotationally about an axis transverse to both said directions;

second means including plural position detectors dipsosed in the optical path and responsive to the image of the marking of a data field and providing plural control signals representing the relative position of the data track images;

control means connecting the second means to the adjusting means to cause the images of the track to be laterally and rotationally displaced for repeated passage along two points;

a pair of read detectors disposed in the two points and responsive to passage of marker images and providing signals representative thereof;

first circuit means including two signal channels respectively connected to the read detectors of the pair and assembling the signals;

second circuit means connected to the first circuit means to provide distinction as to completion of signal assembly as representing a character;

third circuit means connected to test whether the number of signals representing the markings are constant per character;

fourth means connected to assemble representation of sequential characters as read from a single data field; and fifth circuit means responsive to completion of data field read-out and operating for controlling repetition of read-out in case of an error as detected by the third circuit.

2. Apparatus as in claim 1, wherein the number of markings per character is four.

3. A method for identifying objects comprising the steps of providing a data field onto an object, the data field comprising plural individual characters arranged along a first direction, each character consisting of four individual contrast producing markers of digital significance arranged on and along two parallel, spaced-apart tracks and in the first direction, the markings extending transverse to the tracks in a second direction, but being separated from each other and spaced-apart along the tracks, there being three spaced-apart marker positions per track and character, and four markers and two vacant positions per character, and including the providing of additional contrasting demarkations for each character in the secnd direction but outside of the area proper establishing the two tracks, but including the area in-between the tracks to obtain visually readable characters;

providing additionally contrasting information as to the beginning and/or end of the data field;

elecro-optically locating a data field when in a particular area and detecting the location and direction of extension of the tracks of the data field;

electro-optically scanning the two tracks of the detected data field, separately and under exclusion of scanning of the area between the tracks, to provide two separate signal trains, each train having signal levels respectively representing bits of particular value indicative of passing across the individual markings during the scanning, and representing absence of such bits, the bit signals occuring in spaced-apart relation for identifying separately and individually each marking as so passed, and as separated from other markings in other marker positions by space equivalent to vacant bit positions;

electronically processing said trains for deriving therefrom distinct and separate signal indication in representation of passing across the information defining beginning or end of the data field, for defining the beginning of each of the trains of bits;

electronically processing said signal trains to derive first indications from all the bits of each of the two signal trains in particular timed relation to each other, the first indications defining three sequential markings and bit positions each, and separately for each track thereby identifying six bit positions for each character as a group, including identifying respective three marking positions in either track, and associating them with three additional marking positions in the respective other track corresponding to alignment of respective two positions in the second direction, the formation of these positions beginning following the providing of the separate signal indication and continuing sequentially for one group of six positions after another;

electronically assembling the bits of particular value as identifying markings in the six positions as identified pursuant to the second electronic processing step, and including providing a bit of value other than the particular value in each of these associated additional marking position which is not by itself identified by a bit of the particular value, to obtain six assembled bits separately for each character;

electrically testing whether the number of bits of particular value markings as so associated with and assembled in six positions is four; and electrically decoding the six bits of a character as particularly associated with and assembled in the six positions, and separately for each character, to obtain the identification of the object.

4. In combination for decoding coded characters disposed on a label and representing numerical values and having the visual appearance of such numerical values, the visual characters being formed in first and second parallel tracks by spaced lines disposed at spaced positions against a contrasting background, the lines in each track being disposed in a direction transverse to the tracks and being disposed at corresponding positions in the two tracks, each of the characters being defined by three successive positions in each track and being formed by four lines in the total of six positions available for each character with substantially all of the characters having at least one line in at least one of the tracks for each of the three successive positions, groups of the successive characters being arranged in fields.

first means for sensing the lines in the first track and for producing first signals in accordance with such sensing, second means for sensing the lines in the second track and for producing second signals in accordance with such sensing, third means for shifting the position of the first and second means relative to the tracks to align the first and second means respectively with the first and second tracks, fourth means responsive to the operation of the third means in aligning the first and second means with the first and second tracks for providing for a presentation of the lines in the first and second tracks relative to the first and second means for the production of signals by the first and second means, fifth means responsive to the signals produced by the first and second means in the successive positions for each character for storing such signals, sixth means responsive to the signals stored by the fifth means for each character and operative to produce signals distinguishing such character in accordance with the individual pattern of signals stored by the fifth means, seventh means responsive to the signals produced by the first and second means for each character for producing a first control signal when four signals are produced by the first and second means for the character, eighth means responsive to the signals produced by the first and second means for producing a second control signal when at least one of the first and second signals is produced by the first and second means in each of the successive positions for individual characters, and ninth means responsive to the seventh and eighth means and operatively coupled to the sixth means for obtaining an operation of the sixth means when the seventh and eithth control signals are simultaneously produced by the fourth and fifth means for a character after the signals representing the character have been stored in the fifth means.

5. The combination set forth in claim 4, including, tenth means responsive to the signals produced by the first and second means for the successive positions of each character for producing clock signals co-ordinate with the presentation of the lines in the first and second means relative to the first and second means.

6. The combination set forth in claim 5, including, eleventh means responsive to the failure of the seventh and eighth means respectively to produce the first and second control signals upon the storage of signals for individual characters in the fifth means for providing for a repetition in the operation of the sixth means in producing signals distinguishing the individual characters.

7. The combination set forth in claim 5, including, twelfth means responsive to a particular number of repetitions in the operation of the sixth means for discontinuing any operation of the fourth means in providing for the presentation of the signals in the first and second tracks relative to the first and second means to obtain the production of signals by the first and second means.

8. The combination set forth in claim 5, wherein the characters are grouped in fields and are disposed in an annular configuration and wherein the third means shifts the position of the first and second means relative to the first and second tracks in first and second co-ordinate directions and wherein the fourth means provides for an annular presentation of the lines in the first and second tracks relative to the first and second means for the production of signals by the first and second means.

9. The combination set forth in claim 5, wherein the spacings between successive characters have a particular value different from the spacings between the lines representing each character and wherein eleventh means are responsive to the spacings between successive characters for providing for the production of a third control signal upon the occurrence of the particular value for such spacings and wherein the ninth means are also responsive to the production of the third control signal after the production of the signals for each character for obtaining the operation of the fifth means for the signals of the next character.

10. The combination set forth in claim 11, including, tenth means responsive to the signals produced by the first and second means for individual characters for producing a third control signal when signals are simultaneously produced by the first and second means for only a single position for such characters, the tenth means being operatively coupled to the ninth means for obtaining an operation of the sixth means when the third control signal is simultaneously produced with the first and second control signals.

11. The combination set forth in claim 11 wherein, a first spacing is provided between the successive positions in each character and a second spacing is provided between the successive characters and a third spacing is provided at the beginning of the data field and tenth means are responsive to the first spacings for synchronizing the operation of the first and second means to sense the lines in the successive positions for each character and eleventh means are responsive to the second spacing for obtaining the sensing of the information for the successive characters and eleventh means are responsive to the third spacing for initiating the operation of the first and second means.

12. The combination set forth in claim 11 wherein, twelfth means are responsive to the failure of the sixth means to produce signals distinguishing an individual character for initiating a new scanning by the first and second means of the data field.

* * * * *